(12) United States Patent
Yu et al.

(10) Patent No.: US 10,002,293 B2
(45) Date of Patent: Jun. 19, 2018

(54) IMAGE COLLECTION WITH INCREASED ACCURACY

(71) Applicant: BEIJING ZHIGU RUI TUO TECH CO., LTD., Beijing (CN)

(72) Inventors: Kuifei Yu, Beijing (CN); Lin Du, Beijing (CN); Hongjiang Zhang, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 197 days.

(21) Appl. No.: 14/904,933

(22) PCT Filed: Jul. 2, 2014

(86) PCT No.: PCT/CN2014/081481
§ 371 (c)(1),
(2) Date: Jan. 13, 2016

(87) PCT Pub. No.: WO2015/035823
PCT Pub. Date: Mar. 19, 2015

(65) Prior Publication Data
US 2016/0148049 A1    May 26, 2016

(30) Foreign Application Priority Data

Sep. 16, 2013 (CN) .......................... 2013 1 0419787

(51) Int. Cl.
*G06K 9/00* (2006.01)
*H04N 5/232* (2006.01)
(Continued)

(52) U.S. Cl.
CPC ......... *G06K 9/00604* (2013.01); *G06F 3/013* (2013.01); *G06T 7/74* (2017.01);
(Continued)

(58) Field of Classification Search
None
See application file for complete search history.

(56) References Cited

U.S. PATENT DOCUMENTS 6,027,216 A    2/2000  Guyton et al.
7,298,414 B2  11/2007  Stavely et al.
(Continued)

FOREIGN PATENT DOCUMENTS

CN    1271233 A    10/2000
CN    1910504 A     2/2007
(Continued)

OTHER PUBLICATIONS

PCT International Search Report and Written Opinion dated Oct. 15, 2014, issued in corresponding International Application No. PCT/CN2014/081481 (10 pages).
(Continued)

*Primary Examiner* — Reza Aghevli (57) ABSTRACT

Image collection is provided, e.g., a system includes a gaze point detection device for detecting a location of a gaze point of a user with respect to the user, and an image collection device for focusing and collecting a first image according to the location of the gaze point with respect to the user. The gaze point detection device comprises a fundus image collection module for collecting a second image of a fundus of a user, an adjustable lens module for adjusting an imaging parameter of an optical path between the fundus image collection module and an eye and an image processing module for calculating the location of a gaze point of the user with respect to the user according to the imaging parameter. The system and method of the present application can increase the focusing accuracy and the focusing speed of an image collection apparatus.

29 Claims, 7 Drawing Sheets

(51) Int. Cl.
 *G06F 3/01* (2006.01)
 *G06T 7/73* (2017.01)
(52) U.S. Cl.
 CPC ......... *H04N 5/232* (2013.01); *H04N 5/23219* (2013.01); *G03B 2213/025* (2013.01); *G06T 2207/30201* (2013.01)

(56) References Cited

U.S. PATENT DOCUMENTS

| | | | |
|---|---|---|---|
| 2004/0100567 A1* | 5/2004 | Miller | G02B 27/0093 348/239 |
| 2006/0082726 A1* | 4/2006 | Suzuki | A61B 3/12 351/206 |
| 2010/0053555 A1* | 3/2010 | Enriquez | A61B 3/113 351/210 |
| 2010/0188502 A1 | 7/2010 | Kikawa et al. | |
| 2013/0083003 A1* | 4/2013 | Perez | G06F 3/005 345/419 |
| 2014/0003738 A1* | 1/2014 | Williams | A61B 3/113 382/282 |
| 2014/0191946 A1* | 7/2014 | Cho | G02B 27/017 345/156 |

FOREIGN PATENT DOCUMENTS

| | | |
|---|---|---|
| CN | 101141567 A | 3/2008 |
| CN | 102436306 A | 5/2012 |
| CN | 102572217 A | 7/2012 |
| CN | 103501406 A | 1/2014 |

OTHER PUBLICATIONS

Office Action for Chinese Patent Application No. 201310419787.0 dated Oct. 11, 2016, with English Translation, 12 pages.

\* cited by examiner

IMAGE COLLECTION WITH INCREASED ACCURACY

CROSS REFERENCE TO RELATED APPLICATION

The present application is a national stage application of International Application No. PCT/CN2014/081481, filed on Jul. 2, 2014, which claims priority to and benefits of Chinese Patent Application No. 201310419787.0, entitled "Image collection system and image collection method," and filed on Sep. 16, 2013. The contents of both of the above-referenced applications are incorporated herein by reference in their entirety.

TECHNICAL FIELD

The present application relates to the technical field of image collection, and, in particular, to image collection that achieves greater accuracy.

BACKGROUND

As the human-computer interaction technology develops increasingly, the human-computer interface more emphasizes the "human-centered" principle, so that a user can use various sensory channels to interact with a computer apparatus in a most natural manner.

The sight line of a user reflects the interested object, destination and demand of the user, having an input-output bidirectional characteristic. Gaze point detection makes it possible to extract information useful for human-computer interaction, so as to realize a natural, intuitive and effective interaction, and therefore is applied to various aspects of human-computer interaction more and more. For example, during the focusing of an image collection apparatus, the interested object of a user can be determined by detecting a gaze point of the user to thereby help the image collection apparatus in focusing.

SUMMARY

The following presents a simplified summary in order to provide a basic understanding of some aspects or embodiments disclosed herein. This summary is not an extensive overview. It is intended to neither identify key or critical elements nor delineate the scope of the aspects or embodiments disclosed. Its sole purpose is to present some concepts in a simplified form as a prelude to the more detailed description that is presented later.

An example, non-limiting object of the present application is to provide an image collection technology to increase the focusing accuracy of an image collection apparatus.

In a first example embodiment, the present application provides an image collection system, comprising:
a gaze point detection device for detecting the location of a gaze point of a user with respect to the user; and
at least one image collection device for focusing and collecting at least one first image according to the location of the gaze point with respect to the user;
wherein the gaze point detection device comprises:
a fundus image collection module for collecting at least one second image of a fundus of a user;
at least one adjustable lens module for adjusting at least one imaging parameter of an optical path between the fundus image collection module and an eye of the user, until the fundus image collection module obtains at least a subset of the at least one second image that satisfies at least one defined clarity criterion; and
an image processing module configured to process at least the subset of the at least one second image that satisfies the at least one defined clarity criterion, obtain the at least one imaging parameter corresponding to at least the subset of the at least one second image that satisfies the at least one defined clarity criterion and an optical axis direction of the eye, and determine the location of the gaze point of the user with respect to the user.

In a second example embodiment, the present application provides a method, comprising:
detecting a location of a gaze point of a user with respect to the user; and
focusing and collecting at least one first image according to the location of the gaze point with respect to the user,
wherein the detecting comprises:
collecting at least one second image of a fundus of the user;
adjusting at least one imaging parameter of an optical path between a collection location of the at least one second image and an eye of the user, until at least a subset of the at least one second image that satisfies at least one defined clarity criterion is obtained during the collecting the at least one second image of the fundus of the user;
processing at least the subset of the at least one second image that satisfies the at least one defined clarity criterion;
obtaining the at least one imaging parameter corresponding to at least the subset of the at least one second image that satisfies the at least one defined clarity criterion and an optical axis direction of the eye; and
determining the location of the gaze point of the user with respect to the user.

In a third example embodiment, the present application provides a computer-readable storage device, comprising at least one executable instruction, which, in response to execution, causes a device comprising a processor to perform operations, comprising:
detecting a location of a gaze point of a user with respect to the user; and
focusing and collecting at least one first image according to the location of the gaze point with respect to the user;
wherein the detecting the location of the gaze point comprises:
collecting at least one second image of a fundus of the user;
adjusting at least one imaging parameter of an optical path between a collection location of the at least one second image and an eye of the user, until the at least one second image that satisfies at least one defined clarity criterion is obtained during the collecting of the at least one second image of the fundus of the user;
processing the at least one second image that satisfies the at least one defined clarity criterion;
obtaining the at least one imaging parameter corresponding to the at least one second image that satisfies the at least one defined clarity criterion and an optical axis direction of the eye; and
calculating the location of the gaze point of the user with respect to the user.

In a fourth example embodiment, the present application provides an image collection system, characterized by comprising a processing device and a memory, wherein the memory stores at least one executable instruction, the processing device is connected to the memory via a communication bus, and when the image collection system executes, the processing device executes the at least one executable instruction stored in the memory, so that the image collection system executes operations, comprising detecting a location of a gaze point of a user with respect to the user; and focusing and collecting at least one first image according to the location of the gaze point with respect to the user;

wherein the detecting the location of the gaze point comprises:

collecting at least one second image of a fundus of the user;

adjusting at least one imaging parameter of an optical path between a collection location of the at least one second image and an eye of the user, until the at least one second image that satisfies at least one defined clarity criterion is obtained during the collecting of the at least one second image of the fundus of the user; and processing the at least one second image that satisfies the at least one defined clarity criterion;

obtaining the at least one imaging parameter corresponding to the at least one second image that satisfies the at least one defined clarity criterion and an optical axis direction of the eye; and calculating the location of the gaze point of the user with respect to the user.

At least one technical solution of the embodiments of the present application obtains the location of a gaze point of an eye of a user by detecting the relative distance from the gaze point of the eye of the user to the user and the gaze direction of the eye of the user, so as to complete the automatic focusing of an image collection device, with high accuracy rate and rapid speed of focusing thereof;

at least one technical solution of the embodiments of the present application adopts an electronic focal-length adjustable lens to help a fundus image collection module acquire a clear image of a fundus of a user, so that the gaze point detection device has a compact structure and small volume, and is more suitable to be applied to a wearable near-to-eye apparatus, making it more convenient to use an image collection system;

at least one technical solution of the embodiments of the present application acquires the distance of a gaze point of an eye of a user with respect to the user by shooting an image of the fundus itself of the user or projecting a light spot pattern to the fundus of the user, making the detection accuracy better;

and at least one technical solution of the embodiments of the present application may comprise a plurality of cooperatively focusing image collection devices, which help a user obtain a desired image.

DETAILED DESCRIPTION

The method and device of the present application are described in detail hereinafter with reference to the drawings and embodiments.

Figure 1:
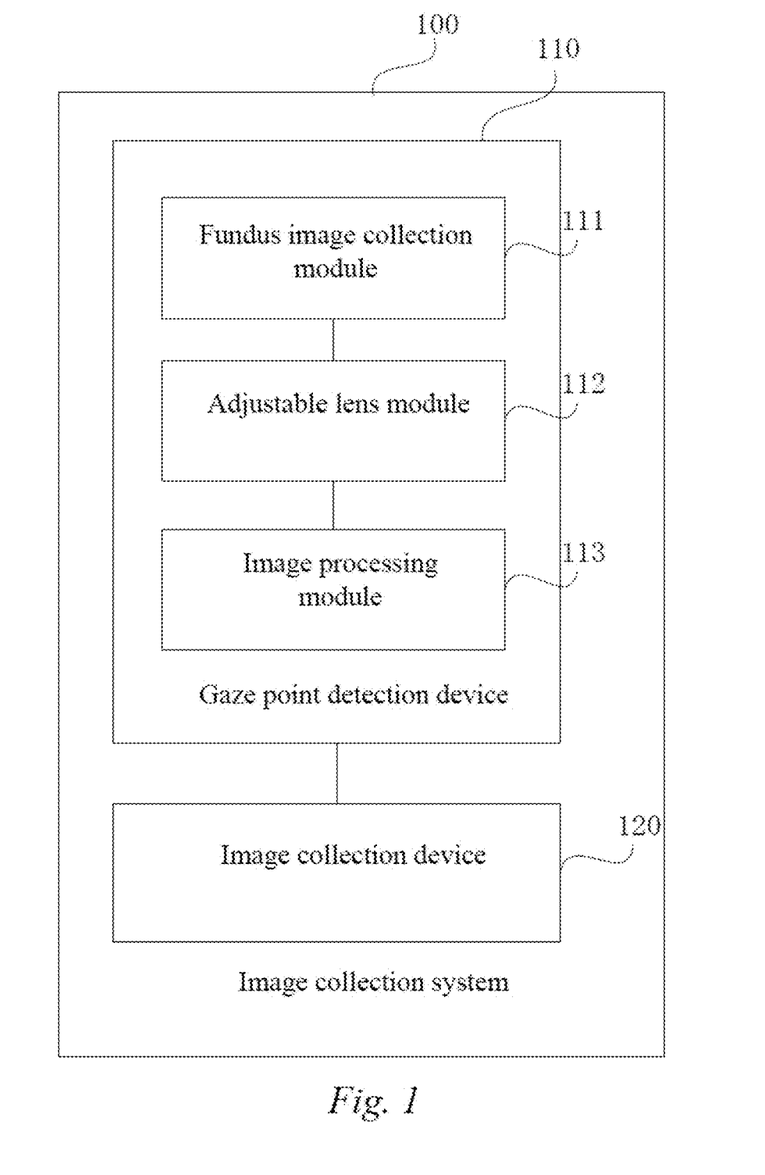
FIG. 1 is an example structural schematic block diagram of an image collection system of the embodiments of the present application.

As shown in FIG. 1, one or more of the embodiments of the present application provide an image collection system 100, comprising:

a gaze point detection device 110 for detecting a location of a gaze point of a user with respect to the user; and at least one image collection device 120 for focusing and collecting at least one first image according to the location of the gaze point with respect to the user;

wherein the gaze point detection device 110 comprises:

a fundus image collection module 111 for collecting at least one second image of a fundus of a user;

an adjustable lens module 112 for adjusting at least one imaging parameter of an optical path between the fundus image collection module 111 and an eye of the user, until the fundus image collection module 111 obtains at least one second image that satisfies at least one defined clarity criterion; and an image processing module 113 for processing the at least one second image that satisfies at least one defined clarity criterion, obtaining the at least one imaging parameter of the optical path between the fundus image collection module 111 and the eye corresponding to the at least one second image that satisfies at least one defined clarity criterion and the optical axis direction of the eye, and calculating the location of the gaze point of the user with respect to the user (for example, the location thereof with respect to the eye of the user).

Here, the at least one image collection device 120 is used for collecting an image of an object which a user intends to shoot (for example, an object on which the user is fixing) to obtain at least one first image.

In this implementation, the at least one defined clarity criterion, for example, can be a criterion commonly used by those skilled in the art for judging whether an image is clear, such as resolution and so on.

Furthermore, the embodiments of the present application also provide a computer-readable medium, comprising a computer-readable instruction upon the execution of which the following operations are performed, the operations being as follows:

detecting a location of a gaze point of a user with respect to the user; and focusing and collecting at least one first image according to the location of the gaze point with respect to the user;

wherein the detecting the location of a gaze point of a user with respect to the user comprises:

collecting at least one second image of a fundus of the user;

adjusting at least one imaging parameter of an optical path between the collection location of the at least one second image and an eye of the user, until at least one second image that satisfies at least one defined clarity criterion is obtained during the collecting at least one second image of a fundus of the user; and processing the at least one second image that satisfies at least one defined clarity criterion, obtaining the at least one imaging parameter corresponding to the at least one second image that satisfies at least one defined clarity criterion and the optical axis direction of the eye, and calculating the location of the gaze point of the user with respect to the user.

One or more embodiments of the present application obtain the optical axis direction of an eye of a user and the distance from a gaze point to the eye by means of the gaze point detection device 110, thereby being capable of calculating out the location of the gaze point of the user with respect to the user, and then focus for the collection of a first image according to the location of the gaze point, so that the image collection system 100 can rapidly and accurately focus and collect an image of the interested object of the user, enhancing the user experience.

Figure 2:
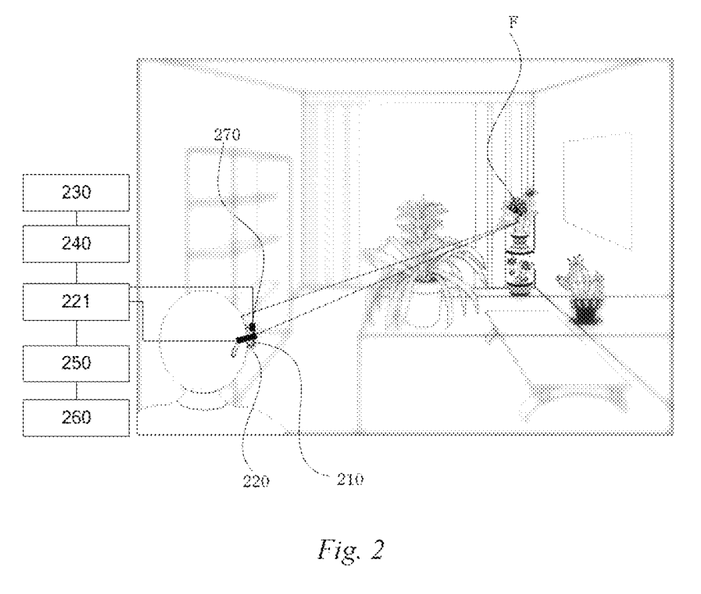
FIG. 2 is an example application scene schematic diagram of an image collection system of the embodiments of the present application.

As shown in FIG. 2, in a possible implementation of the embodiments of the present application, the system further comprises a wearable near-to-eye apparatus 210, the gaze point detection device 270 being arranged on the wearable near-to-eye apparatus 210. In an implementation of the present application, the wearable near-to-eye apparatus can be a pair of spectacles (including a pair of framed spectacles, contact lenses, goggles, etc.) and other devices which are easy to carry and convenient to use. Especially for a user who has suffered from refractive error and other eye problems and needs to wear, for example, a pair of spectacles with correction of refractive error, the system of the present application can be realized directly on the pair of spectacles with correction of refractive error, without bringing about an extra burden to the user. In other possible implementations of the embodiments of the present application, the system may also comprise, for example, other optical apparatuses used matching the eyes of a user, such as a helmet eyepiece, a front windshield for driving, etc., and the gaze point detection device can also be arranged on these optical apparatuses. Of course, it can be known by those skilled in the art that the gaze point detection device itself can also form a wearable near-to-eye apparatus, rather than has to be attached to other apparatuses.

In a possible implementation of the embodiments of the present application, the system comprises an image collection device 220, the image collection device 220 also being arranged on the wearable near-to-eye apparatus 210.

In this implementation, the image collection device 220 can be subjected to parameter calibration, so that the location of the gaze point F of the user eye with respect to the user substantially can be considered as the location of the gaze point F with respect to the image collection device 220; and in this case, without a need of adjusting the shooting angle of the image collection device and additionally calculating the distance of the gaze point F with respect to the image collection device 220, the focusing of the image collection device can be adjusted directly according to the location of the gaze point to obtain a first image needed by the user.

In other possible implementations of the embodiments of the present application, the image collection device can be arranged on a location outside the wearable near-to-eye apparatus 210, for example, the image collection device can be arranged on other wearable apparatuses (for example, a smart watch) of a user; or can also be arranged on a hand-held apparatus (such as a cell phone, a tablet computer and other apparatuses with an image collection module) of a user and so on; or the image collection device is a photo camera, a video camera and other apparatuses special for image collection; or can also be a monitoring apparatus (such as a monitoring camera, etc.) fixedly arranged in a scene.

In this implementation, the image collection device 220 comprises:

a focusing module 221 for adjusting the focusing point location of the image collection device according to the location information and posture information about the image collection device, the location information and posture information about a user, and the location of the gaze point F with respect to the user. In this implementation, by acquiring the location information (including the location information about the image collection device in a scene or the location information thereof with respect to a user) and the posture information (including the shooting optical axis direction and other posture information) about the image collection device, and then after the location information about the gaze point F with respect to the image collection device 220 has been obtained by calculating according to the location information about the gaze point F with respect to the user, focusing and image collection are performed.

In this implementation, the system further comprises:

a user location information acquisition device 230 for acquiring location information about a user;

a user posture information acquisition device 240 for acquiring posture information about the user;

a collection-device location information acquisition device 250 for acquiring location information about each image collection device; and a collection-device posture information acquisition device 260 for acquiring posture information about each image collection device.

In this case:

in a possible implementation, the user location information acquisition device 230 can be a locating module, which collects location information about a user by means of an outdoor or indoor locating module. In another possible implementation, the user location information acquisition device 230 can also be a communication module for receiving location information about a user transmitted from the external.

In a possible implementation, the user posture information acquisition device 240 can be a posture information sensing module for collecting posture information about the user, posture information about the user including the face orientation of the user and so on. In another possible implementation, the user posture information acquisition device 240 can also be a communication module for receiving posture information about the user transmitted from the external.

In a possible implementation, the collection-device location information acquisition device 250 can be the locating module or communication module described above, which acquires location information about an image collection device by way of collecting or receiving same; or, for a monitoring apparatus (such as a monitoring camera) fixed at a specific location, since the location thereof is fixed, the location information about the image collection device is acquired by way of pre-storing the location information about the image collection device 220 in a local storage apparatus, and the collection-device location information acquisition device 250 reading same from the local storage apparatus.

In a possible implementation, the collection-device posture information acquisition device 260 can be a posture information sensing module for collecting posture information about an image collection device, the posture information about the image collection device including the optical axis direction of the image collection device and so on. In another possible implementation, the image-collection-device posture information acquisition device 260 can also be a communication module for receiving posture information about the image collection device transmitted from the external. Furthermore, in other possible implementations, the image collection device may be fixed still, with the posture thereof being unadjustable; in this case, the posture information about the image collection device may also be read from a local storage apparatus.

Figure 3:
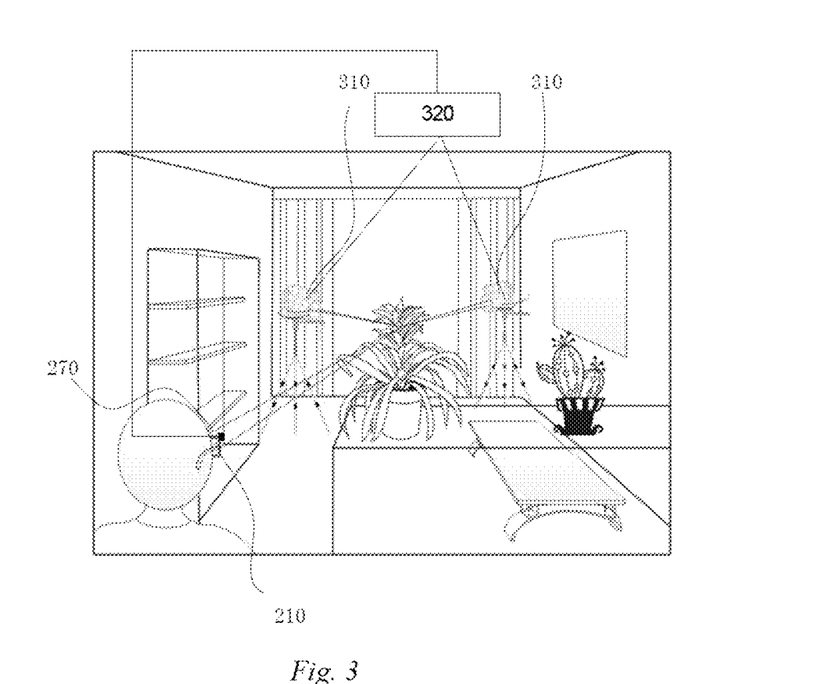
FIG. 3 is an example application scene schematic diagram of another image collection system of the embodiments of the present application.

As shown in FIG. 3, in a possible implementation of the embodiments of the present application, the system comprises a plurality of image collection devices 310. The plurality of image collection devices 310 may include a plurality of forms of image collection devices 310, for example, comprising one or more of an image collection device which is arranged together with the gaze point detection device on a wearable near-to-eye apparatus 210, an image collection device on a cell phone and other portable intelligent apparatuses, a photo camera, a video camera and the like arranged at a required location by a user, a monitoring apparatus fixedly arranged in a scene, etc.

Generally, the plurality of image collection devices 310 are disposed separately, so that they can cooperatively collect an image of an object on which a user fixes at a plurality of angles.

In this case, in a possible implementation of the embodiments of the present application, the system further comprises:

an association device 320 for selecting at least one image collection device 310 to associate same with the gaze point detection device 270; and the image collection device 310 focusing and collecting a first image according to the location of the gaze point with respect to the user when it is associated with the gaze point detection device 270.

In this implementation, the association device 320 can select an image collection device 310 according to an external instruction (for example, an instruction sent by a user) to associate same with the gaze point detection device 270 or release the association thereof; and can also automatically perform the association or association release operation, for example, automatically detecting an image collection device 310 in a scene, and automatically associating same if detected, or can also automatically judge whether an image collection device 310 in a scene satisfies a set association condition (for example, the association condition can be set according to the location and/or performance of the image collection device 310), and automatically associate the image collection device 310 if satisfied.

Figure 4A:
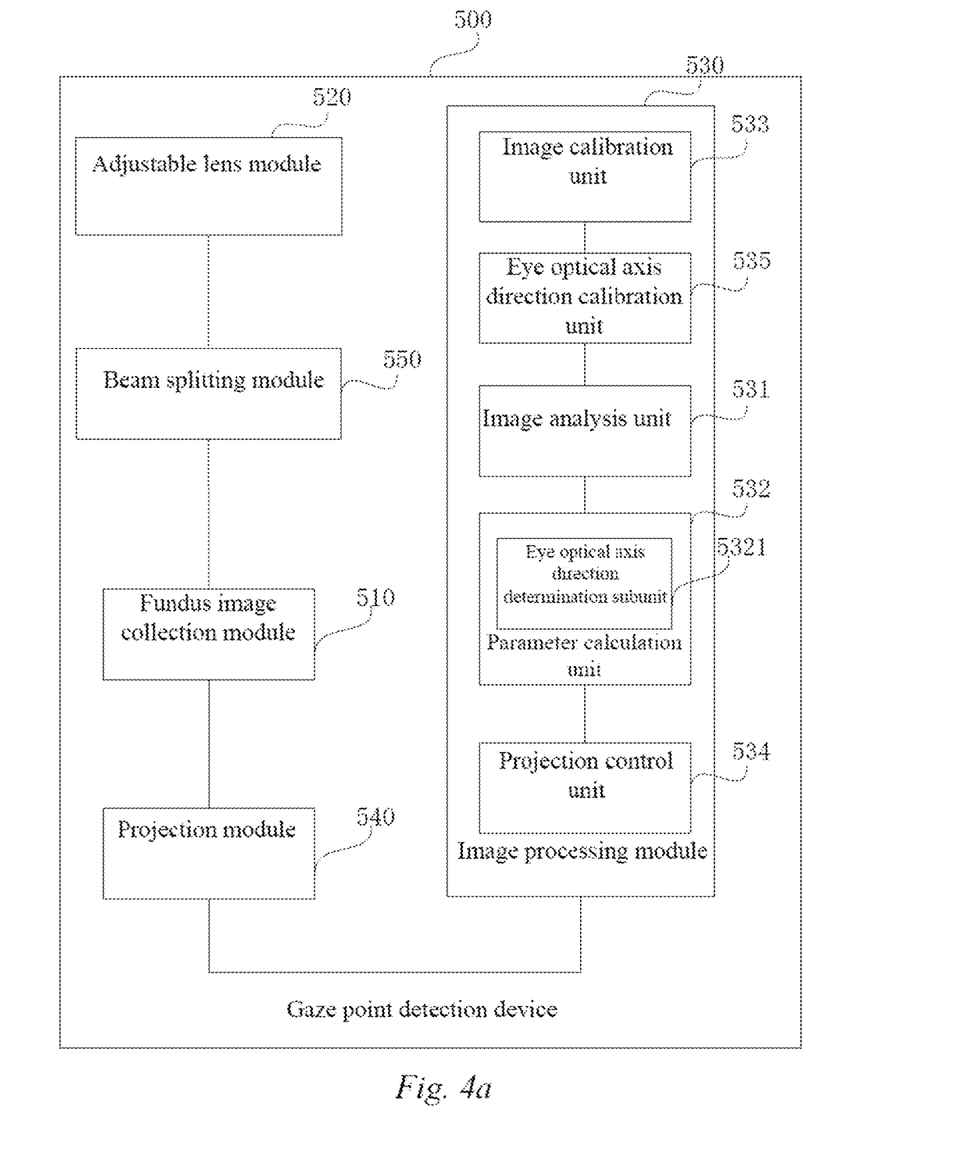
FIG. 4a is an example structural block diagram of a gaze point detection device of an image collection system of the embodiments of the present application.

As shown in FIG. 4a, in a possible implementation of the embodiments of the present application, the gaze point detection device 500 comprises a fundus image collection module 510, an adjustable lens module 520 and an image processing module 530 described in the embodiments above.

The gaze point detection device 500 in the embodiments of the present application, by processing an image of the fundus of an eye, obtains an optical parameter of the eye when the fundus image collection module has obtained at least one second image that satisfies at least one defined clarity criterion and at least one imaging parameter of the optical path between the eye and the fundus image collection module, so that the location of the gaze point of the eye can be calculated, providing a basis for further realizing a self-adaptive operation for eyes.

The image presented at the "fundus" herein mainly is an image presented on the retina, which can be an image of the fundus itself, or can also be an image of other objects projected to the fundus (such as the light spot pattern mentioned below). The eye herein can be a human eye, and can also be an eye of other animals.

In a possible implementation of the embodiments of the present application, the fundus image collection module 510 can be a micro camera, and in another possible implementation of the embodiments of the present application, the fundus image collection module 510 can also directly use a photosensitive imaging device, such as a CCD device or a CMOS device, etc.

In a possible implementation of the embodiments of the present application, the adjustable lens module 520 is located on the optical path between an eye and the fundus image collection module 510, with the focal length thereof being adjustable and/or the location thereof in the optical path being adjustable. The equivalent focal length of an optical system between an eye and the fundus image collection module 510 is enabled to be adjustable by means of the adjustable lens module 520, and by adjusting the adjustable lens module 520, the fundus image collection module 510 is enabled to obtain a clearest second image of the fundus in some location or state of the adjustable lens module 520. In this implementation, the adjustable lens module 520 can be adjusted continuously in real time during detection.

In a possible implementation of the embodiments of the present application, the adjustable lens module 520 can be a focal-length adjustable lens for completing the adjustment of the focal length of its own by adjusting the refractive index and/or shape of its own. In particular, 1) the focal length is adjusted by adjusting the curvature of at least one surface of the focal-length adjustable lens, for example, adjusting the curvature of the focal-length adjustable lens by increasing or decreasing a liquid medium in a cavity formed by a double-layer transparent layer; 2) the focal length is adjusted by changing the refractive index of the focal-length adjustable lens, for example, filling a specific liquid crystal medium in the focal-length adjustable lens, and adjusting the arrangement mode of the liquid crystal medium by adjusting the voltage of a corresponding electrode of the liquid crystal medium, to thereby change the refractive index of the focal-length adjustable lens.

The embodiments of the present application adopt the focal-length adjustable lens as the adjustable lens module 520, and therefore, compared with US Patent Publication No. U.S. Pat. No. 7,298,414 B2 in which an image reflected by an eye is obtained by moving the location of a lens and/or an image sensor, the gaze point detection device 500 in the embodiments of the present application is of a smaller and more compact structure, and is suitable to be applied to a wearable apparatus.

In another possible implementation of the embodiments of the present application, the adjustable lens module 520 comprises: a lens set composed of a plurality of lenses for completing the adjustment of the focal length of the lens set itself by adjusting the relative locations of the lenses in the lens set. The lens set may also comprise a lens with adjustable focal length and other imaging parameters.

In addition to the above-mentioned two ways of changing the optical path parameters of the system by adjusting the characteristics of the adjustable lens module 520 itself, the optical path parameters of the system can be changed by adjusting the location of the adjustable lens module 520 on the optical path.

In a possible implementation of the embodiments of the present application, in order not to affect the viewing experience of a user to an observed object, and in order to enable a module to be portably applied to a wearable apparatus, the gaze point detection device 500 may also comprise: a beam splitting module 550 for forming a light transfer path between an eye and the observed object and between the eye and the fundus image collection module 510. In this way, an optical path can be folded to reduce the volume of a module, and at the same time, other visual experiences of a user are not affected as much as possible.

In this implementation, the beam splitting module 550 may comprise: a first beam splitting unit which is located between an eye and an observed object, and used for transmitting the light from the observed object to the eye and transferring the light from the eye to a fundus image collection module.

The first beam splitting unit can be a beam splitter, a beam splitting optical waveguide (including an optical fiber) or other suitable beam splitting apparatuses.

In a possible implementation of the embodiments of the present application, the image processing module 530 of the module comprises an optical path calibration module for calibrating the optical path of the system, for example, aligning and calibrating the optical axis of the optical path, etc., to ensure the precision of measurement.

In a possible implementation of the embodiments of the present application, the image processing module 530 comprises:

an image analysis unit 531 for analyzing at least one second image obtained by the fundus image collection module to find out a clearest second image; and a parameter calculation unit 532 for calculating an optical parameter of an eye and the location of the gaze point of the eye with respect to a user according to the clearest image and the known imaging parameters of the module when the clearest image is obtained.

In this implementation, the fundus image collection module 510 is enabled to obtain a clearest image by means of the adjustable lens module 520, but it needs to find out the clearest image by means of the image analysis unit 531, and then, the optical parameter of an eye can be calculated out according to the clearest image and the known optical path parameters of the module. The optical parameter of an eye herein can include the optical axis direction of the eye.

In a possible implementation of the embodiments of the present application, the gaze point detection device 500 may also comprise: a projection module 540 for projecting a light spot to the fundus. In a possible implementation, the function of the projection module can be realized by means of a micro projector.

The light spot projected herein can have no specific pattern and be merely used for lighting the fundus.

Figure 4B:
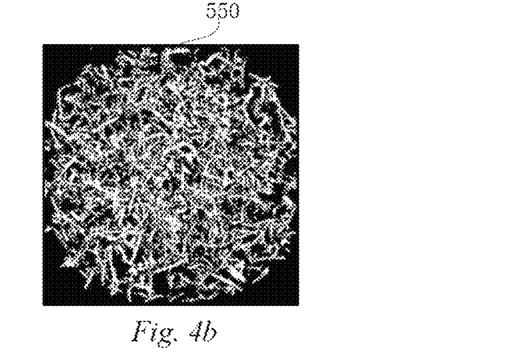
FIG. 4b is an example schematic diagram of a light spot pattern used by a gaze point detection device of an image collection system of the embodiments of the present application.
Figure 4C:
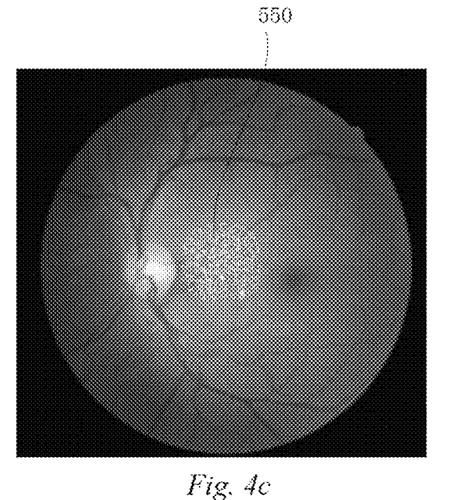
FIG. 4c is an example schematic diagram of a fundus image with a light spot pattern shot by a gaze point detection device of an image collection system of the embodiments of the present application.

In an implementation of the embodiments of the present application, the projected light spot can include a pattern with abundant features. The abundant features of a pattern can facilitate the detection and enhance the detection precision. What is shown in FIG. 4b is an exemplary diagram of a light spot pattern 550, which pattern can be formed by a light spot pattern generator, such as frosted glass; and what is shown in FIG. 4c is an image of the fundus shot when the light spot pattern 550 is projected thereon.

In order not to affect the normal viewing of an eye, the light spot can be an infrared light spot which is invisible to the eye.

In this case, in order to reduce the disturbance of other spectra:

an emergent surface of the projection module 540 can be provided with an eye-invisible light transmission filter.

An incident surface of the fundus image collection module 510 is provided with an eye-invisible light transmission filter.

In a possible implementation of the embodiments of the present application, the image processing module 530 may also comprise:

a projection control unit 534 for controlling the brightness of the light spot projected by the projection module according to a result obtained by an image analysis unit.

For example, the projection control unit 534 can self-adaptively adjust the brightness according to the characteristics of an image obtained by the fundus image collection module 510. The characteristics of an image herein include the contrast of image features, texture features, etc.

Here, a special circumstance of controlling the brightness of the light spot projected by the projection module is to turn on or turn off the projection module, for example, the projection module can be turned off periodically when a user continuously fixes on one point; and when the fundus of a user is bright enough, a light emitting source can be turned off and the distance from the gaze point of the sight line of an eye to the eye can be detected only using the information about the fundus.

Furthermore, the projection control unit 534 can also control the brightness of the light spot projected by the projection module according to the ambient light.

In a possible implementation of the embodiments of the present application, the image processing module 530 may also comprise: an image calibration unit 533 for calibrating a fundus image to obtain at least one reference image corresponding to the image presented at the fundus.

The image analysis unit 531 compares at least one second image obtained by the fundus image collection module 530 with the reference image and calculates same to obtain the clearest second image. Here, the clearest second image can be an image obtained the difference between which and the reference image is minimum. In this implementation, the difference between the second image obtained and the reference image is calculated by means of an existing image processing algorithm, for example, using a classical phase difference automatic focusing algorithm.

In a possible implementation of the embodiments of the present application, the parameter calculation unit 532 may comprise:

an eye optical axis direction determination subunit 5321 for obtaining the optical axis direction of an eye according to the features of the eye when the clearest second image is obtained.

The features of an eye herein can be acquired from the clearest second image, or can also be acquired otherwise. The optical axis direction of an eye represents the gaze direction of the sight line of the eye.

In a possible implementation of the embodiments of the present application, the eye optical axis direction determination subunit 5321 may comprise: a first determination subunit for obtaining the optical axis direction of an eye according to the features of the fundus when the clearest second image is obtained. Compared with obtaining the optical axis direction of an eye by means of the features of the pupil and the eyeball surface, the accuracy of obtaining the optical axis direction of an eye by means of the features of the fundus is higher.

When a light spot pattern is projected to the fundus, the size of the light spot pattern may be larger than a visible region of the fundus or smaller than that, wherein:

when the area of the light spot pattern is smaller than or equal to that of the visible region of the fundus, the optical axis direction of an eye can be determined by detecting the location of the light spot pattern on a second image with respect to the fundus using a classical feature point matching algorithm (for example, the scale invariant feature transform algorithm (SIFT));

when the area of the light spot pattern is greater than or equal to that of the visible region of the fundus, the optical axis direction of an eye can be determined by means of the location of the light spot pattern on the second image obtained with respect to an original light spot pattern (obtained by an image calibration unit) so as to determine the direction of sight line of a user.

In a possible implementation of the embodiments of the present application, the eye optical axis direction determination subunit 5321 comprises: a second determination subunit for obtaining the optical axis direction of an eye according to the features of the eye pupil when the clearest second image is obtained. The features of the eye pupil herein can be acquired from the clearest second image, and can also be acquired otherwise. The obtainment of the optical axis direction of an eye by means of the features of the eye pupil is an existing technology, which will not be described here.

In a possible implementation of the embodiments of the present application, the image processing module 530 may also comprise: an eye optical axis direction calibration unit 535 for calibrating the optical axis direction of an eye to determine the optical axis direction of the eye more accurately.

In this implementation, the known imaging parameters of the module include a fixed imaging parameter and a real-time imaging parameter, wherein the real-time imaging parameter is the parameter information about the adjustable lens unit when a clearest second image is acquired, and the parameter information can be obtained by recording in real time when the clearest second image is acquired.

Figure 5A:
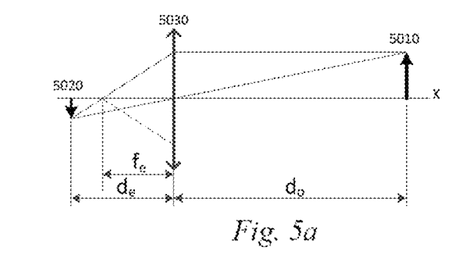
FIG. 5a is an example optical path schematic diagram of eye imaging of a gaze point detection device of an image collection system of the embodiments of the present application.

After the known imaging parameters of an optical path system between an eye and a fundus image collection module has been obtained, the distance from the gaze point of the eye to the eye can be calculated out, which is in particular as follows:

what is shown in FIG. 5a is a schematic diagram of eye imaging, and equation (1) can be obtained from FIG. 5a in combination with the lens imaging equation in the classical optical theory:

$$\frac{1}{d_o} + \frac{1}{d_e} = \frac{1}{f_e} \qquad (1)$$

where $d_o$ and $d_e$ are the distance from an observed object 5010 of an eye to an eye equivalent lens 5030 and the distance from a real image 5020 on the retina to the eye equivalent lens 5030 respectively, $f_e$ is the equivalent focal length of the eye equivalent lens 5030, and X is the optical axis direction of the eye (i.e., the optical axis of the sight line).

Figure 5B:
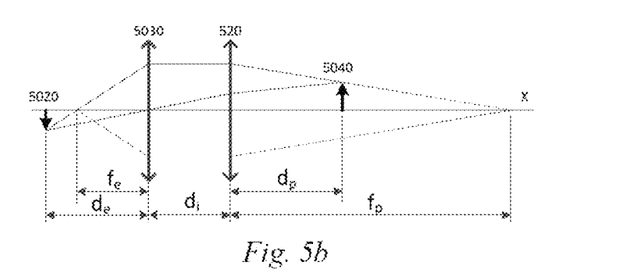
FIG. 5b is an example schematic diagram where a gaze point detection device of an image collection system of the embodiments of the present application obtains the location of a gaze point of an eye with respect to a user according to known imaging parameters of the system.

What is shown in FIG. 5b is a schematic diagram where the distance from the gaze point of an eye to the eye is obtained according to the known optical parameters of the module and the optical parameters of the eye; in FIG. 5b, a light spot 5040 will form a virtual image (not shown in FIG. 5b) via an adjustable lens module 520, and by assuming the distance of the virtual image from the lens to be x (not shown in FIG. 5b), in combination with the equation (1), the following set of equations can be obtained:

$$\begin{cases} \dfrac{1}{d_p} - \dfrac{1}{x} = \dfrac{1}{f_p} \\ \dfrac{1}{d_1 + x} + \dfrac{1}{d_e} = \dfrac{1}{f_e} \end{cases} \qquad (2)$$

where $d_p$ is the optical equivalent distance from the light spot 5040 to the adjustable lens module 520, $d_i$ is the optical equivalent distance from the adjustable lens module 520 to the eye equivalent lens 5030, $f_p$ is the focal length value of the adjustable lens module 520, and $d_i$ is the distance from the eye equivalent lens 5030 to the adjustable lens module 520.

The distance $d_o$ from the observed object 5010 (the gaze point of the eye) to the eye equivalent lens 5030 can be obtained as shown in equation (3) from (1) and (2):

$$d_o = d_i + \frac{d_p \cdot f_p}{f_p - d_p} \qquad (3)$$

According to the distance from the observed object 5010 to the eye calculated above, and the optical axis direction of the eye which can be obtained as a result of the preceding description, the location information about the gaze point of the eye with respect to a user can be obtained easily, providing a basis for subsequent further interaction associated with the eye.

Figure 6:
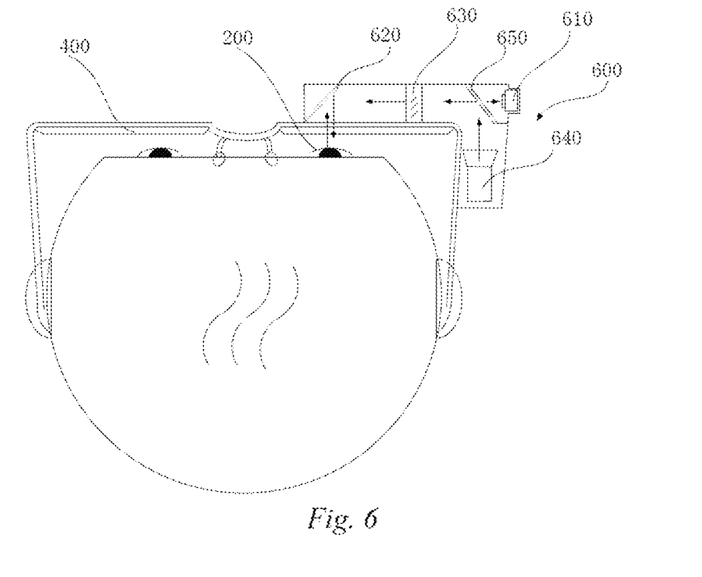
FIG. 6 is an example schematic diagram of a gaze point detection device of an image collection system of the embodiments of the present application applied to a pair of spectacles.

What is shown in FIG. 6 is the embodiment of applying a gaze point detection device 600 in a possible implementation of the embodiments of the present application to a pair of spectacles 400, which comprises the contents described in the implementation as shown in FIG. 4a, and is in particular as follows: it can be seen from FIG. 6 that in this implementation, the gaze point detection device 600 of this implementation is integrated to the right side of the spectacles 400, comprising:

a micro camera 610 which functions the same as the fundus image collection module described in the implementation of FIG. 4a, and is arranged at the outer right side of an eye 200 in order not to affect the sight line of a user normally viewing an object;

a first beam splitter 620 which functions the same as the first beam splitting unit described in the implementation of FIG. 4a, is arranged with a certain tilt angle at the intersection point of the gaze direction of the eye 200 and the incident direction of the camera 610, and transmits the light entering into the eye 200 from an observed object and reflects the light from the eye to the camera 610; and a focal-length adjustable lens 630 which functions the same as the focal-length adjustable lens described in the implementation of FIG. 4a, is located between the first beam splitter 620 and the camera 610, and adjusts the focal length value in real time, so that the camera 610 can shoot a clearest second image of the fundus at some focal length value.

In this implementation, the image processing module is not shown in FIG. 6, and functions the same as the image processing module as shown in FIG. 4a.

Since the brightness of the fundus is not enough under normal circumstances, the fundus had better be illuminated, and in this implementation, the fundus is illuminated by a light emitting source 640. In order not to affect the user experience, the light emitting source 640 herein can be an eye-invisible light emitting source, and further, can be a near-infrared light emitting source which does not much affect the eye 200 and to which the camera 610 is relatively sensitive.

In this implementation, the light emitting source 640 is located at the outer side of the right side of a spectacle frame, so it needs a second beam splitter 650 together with the first beam splitter 620 to complete the transferring of the light emitted by the light emitting source 640 to the fundus. In this implementation, the second beam splitter 650 is also located in front of the incident surface of the camera 610, so it needs to transmit the light from the fundus to the camera 610.

It can be seen that in this implementation, in order to enhance the user experience and enhance the collection definition of the camera 610, the first beam splitter 620 can have the characteristics of high reflectivity to infrared and high transmissivity to visible light. For example, an infrared reflective film can be arranged at the side of the first beam splitter 620 facing the eye 200 to realize the characteristics described above.

It can be seen from FIG. 6 that since in this implementation, the eye gaze point detection device 600 is located at the side of the lens of the spectacles 400 away from the eye 200, the lens can be considered as a part of the eye 200 during the calculation of the optical parameters of the eye, without a need of knowing the optical characteristics of the lens.

In other implementations of the embodiments of the present application, the eye gaze point detection device 600 may be located at the side of the lens of the spectacles 400 close to the eye 200, and then, it needs to obtain the optical characteristic parameters of the lens in advance and take the affecting factor of the lens into account when the distance from the gaze point to the eye of a user is being calculated.

The light emitted by the light emitting source is reflected by the second beam splitter 650, transmitted by the focal-length adjustable lens 630 and reflected by the first beam splitter 620, then transmits through the lens of the spectacles 400 to enter into the eye of a user, and finally arrives at the retina of the fundus; and the camera 610 shoots an image of the fundus through the pupil of the eye 200 via an optical path composed of the first beam splitter 620, the focal-length adjustable lens 630 and the second beam splitter 650.

Figure 7:
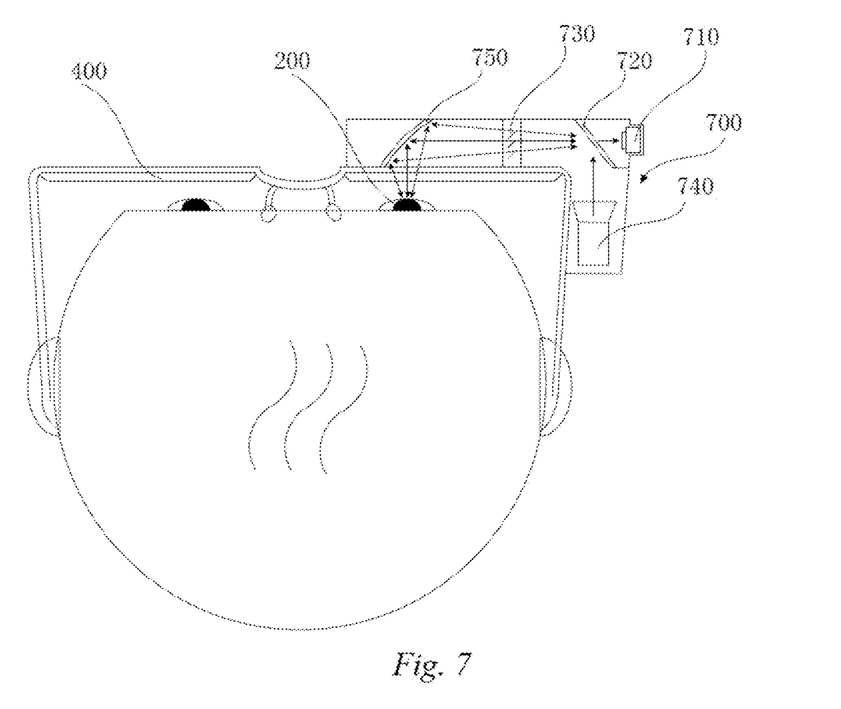
FIG. 7 is an example schematic diagram of a gaze point detection device of another image collection system of the embodiments of the present application applied to a pair of spectacles.

What is shown in FIG. 7 is a structural schematic diagram of a gaze point detection device 700 of another implementation of the embodiments of the present application. It can be seen from FIG. 7 that this implementation is similar to the implementation shown in FIG. 6, comprising a micro camera 710, a second beam splitter 720 and a focal-length adjustable lens 730, except that the projection module 740 in this implementation is a projection module 740 for projecting a light spot pattern, and the first beam splitter in the implementation of FIG. 6 is replaced with a curved beam splitter 750 as a curved beam splitting module.

The curved beam splitter 750 is adopted here to transfer at least one image presented at the fundus to the fundus image collection module, and wherein the at least one image respectively correspond to at least one location of the pupil associated with different optical axis directions of the eye. In this way, the camera can shoot the mixed and superimposed images formed of various angles of the eyeball; however, since only the fundus part through the pupil can clearly focus on the camera, while other parts will defocus and thereby fail at clear focus, the formed image of the fundus part will not be disturbed severely, and the features of the fundus part can still be detected out. Therefore, compared with the implementation shown in FIG. 6, this implementation can obtain an image of the fundus well in different gaze directions of an eye, so that the eye gaze point detection device of this implementation has wider scope of application and higher detection precision.

In a possible embodiment of the embodiments of the present application, the embodiments of the present application are described further with an image collection system only having one image collection device:

in this embodiment, the gaze point detection device is arranged on a spectacle apparatus, and the image collection device is also arranged on the spectacle apparatus; in this case, it can be thought that the first image collected by the image collection device is substantially the image seen by a user.

According to the implementations described in the embodiments of FIG. 4a to FIG. 7, the location information about a gaze point of a user with respect to the user and the orientation and distance of the gaze point with respect to the user are obtained in real time by means of the gaze point detection device;

the focal length and other parameters of the image collection device are adjusted according to the distance of the gaze point with respect to the user; and after the parameters of the image collection device have been adjusted successfully, a shutter is triggered directly to collect a first image. Or in other embodiments, the image collection device is triggered via an external instruction to collect a first image; for example, the trigger instruction is transmitted by means of a wink of a user.

In another possible embodiment of the embodiments of the present application, the embodiments of the present application are described further with an image collection system having a plurality of image collection devices disposed separately (the image collection system as shown in FIG. 3):

in this embodiment, in addition to a gaze point detection device and image collection devices, the image collection system further comprises an association device. In this embodiment, as an example, the gaze point detection device is arranged on a spectacle apparatus, and the association device is also arranged on the spectacle apparatus, and the spectacle apparatus herein can be an intelligent spectacle apparatus.

By means of the association device, a plurality of image collection devices are selected simultaneously or in turn to be associated with the gaze point detection device. For example, some image collection device is associated by means of an action instruction such as a wink and so on, and the intelligent spectacle apparatus may have a display interface or an audible prompt to prompt a user that some or a plurality of image collection device(s) has(have) been associated;

after the location of the gaze point of the user with respect to the user has been obtained by means of the gaze point detection device, each image collection device having been associated, according to the location and posture information about its own and the location and posture information about the user, calculates out a parameter adjustment value of its own, such as an adjustment value of shooting angle, an adjustment value of focusing parameters, etc., and focuses on an object corresponding to the gaze point according to these parameter adjustment values (in which process, the operating state, such as "being calculating", "being focusing", "focusing succeeded" and so on, of the image collection device can be fed back to the intelligent spectacle apparatus and thereby transmitted to the user);

after having succeeded in focusing, the image collection device can automatically collect a first image, or after the image collection device has succeeded in focusing, the user sends out an image collection trigger instruction (for example, he/she can send out the instruction by means of the intelligent spectacle apparatus), to control the image collection device to collect a first image;

the first image (including a picture or a video) obtained by the image collection device can be exhibited to the user by means of the intelligent spectacle apparatus, for the user to perform a further operation (such as editing or selecting);

the user sends out an instruction again to the association device to release the association with the image collection device.

Figure 8:
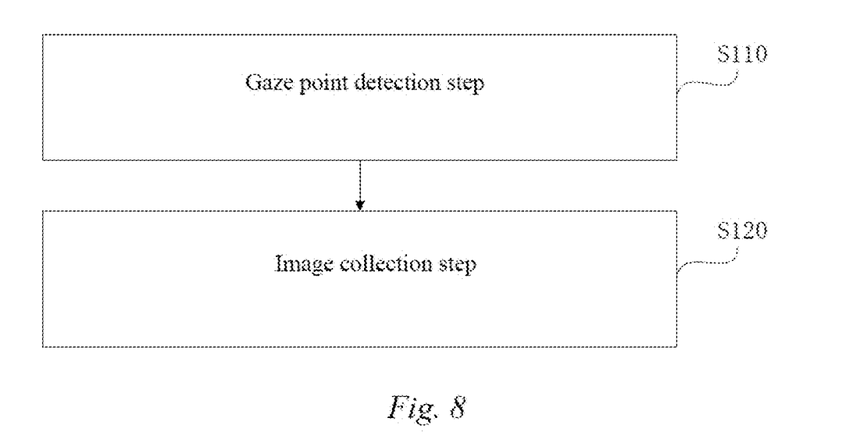
FIG. 8 is an example step flowchart of an image collection method of the embodiments of the present application.

As shown in FIG. 8, the embodiments of the present application also provide an image collection method, comprising:

S110: a gaze point detection step of detecting a location of a gaze point of a user with respect to the user; and S120: an image collection step of focusing and collecting at least one first image according to the location of the gaze point with respect to the user;

wherein the step S110 comprises:

a fundus image collection step of collecting at least one second image of a fundus of the user;

an imaging parameter adjustment step of adjusting at least one imaging parameter of an optical path between the collection location of the at least one second image and an eye of the user until at least one second image that satisfies at least one defined clarity criterion is collected; and an image processing step of processing the at least one second image that satisfies at least one defined clarity criterion, obtaining the at least one imaging parameter corresponding to the at least one second image that satisfies at least one defined clarity criterion and the optical axis direction of the eye, and calculating the location of the gaze point of the user with respect to the user.

The present application obtains the optical axis direction of an eye of a user and the distance from a gaze point to the eye by means of the gaze point detection step, and thereby can calculate out the location of the gaze point of the user with respect to the user, and then focuses for image collection according to the location of the gaze point, so that the image collection step can rapidly and accurately focus on the interested object of the user and collect a first image, enhancing the user experience.

In a possible implementation of the embodiments of the present application, the imaging parameter adjustment step may comprise:

adjusting the focal length of at least one adjustable lens module located on the optical path between the collection location of the second image and an eye of the user.

In a possible implementation of the embodiments of the present application, the gaze point detection step may also comprise:

transferring a at least one image presented at the fundus to the collection location of the at least one second image, and wherein the at least one image respectively correspond to at least one location of the pupil associated with different optical axis directions of the eye.

In a possible implementation of the embodiments of the present application, the gaze point detection step may also comprise:

projecting at least one light spot pattern to the fundus.

The particular implementation of the gaze point detection step can refer to the corresponding description in the gaze point detection step shown in FIG. 4a to FIG. 7, which will not be described in this embodiment.

In a possible implementation of the embodiments of the present application, in order to cooperatively focus on an object on which a user fixes at a plurality of angles, the image collection step may comprise: performing the focusing and collecting at least one first image by a plurality of image collection devices.

In a possible implementation of the embodiments of the present application, the plurality of image collection devices can be disposed separately.

In a possible implementation of the embodiments of the present application, when an image collection device and a user are not in one and the same location, the image collection step may comprise:

adjusting the focusing point location of the image collection device according to the location information and posture information about the collection device of the second image and the user, and the location of the gaze point with respect to the user.

In a possible implementation of the embodiments of the present application, the method may also comprise: acquiring the location information about the user.

In a possible implementation of the embodiments of the present application, the method may also comprise: acquiring the posture information about the user.

In a possible implementation of the embodiments of the present application, the method may also comprise: acquiring the location information about each image collection device.

In a possible implementation of the embodiments of the present application, the method may also comprise: acquiring the posture information about each image collection device.

In a possible implementation of the embodiments of the present application, the method may also comprise:

determining at least one image collection device in the plurality of image collection devices according to the location of the gaze point of the user with respect to the user; and in the image collection step, performing the focusing and collecting a first image by means of the at least one image collection device determined, according to the location of the gaze point with respect to the user.

The implementation of each step described above is the same as the description of the functions of corresponding module or unit in the embodiments of the device described above, which will not be described here.

It should be understood that in various embodiments of the present invention, the serial number of each procedure described above does not mean an execution sequence, and the execution sequence of each procedure should be determined according to the function and internal logic thereof, and should not be any limitation on the implementation procedure of the embodiments of the present invention.

It can be appreciated by those skilled in the art that each exemplary unit and method step described with reference to the embodiments disclosed in this document can be realized by electronic hardware or a combination of computer software and electronic hardware. Whether these functions are executed in a hardware mode or a software mode depends on the specific applications and design constraint conditions of the technical solution. Those professional technicians can use different methods to realize the functions described with respect to each specific application, but this realization shall not be considered beyond the scope of the present application.

If the function is realized in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer apparatus (which can be a personal computer, a server, or a network apparatus, etc.) to execute all or some steps of the method described in each embodiment of the present application. The preceding storage medium comprises various medium which can store a program code, such as a USB disk, a mobile hard disk, a read-only memory (ROM), a random access memory (RAM), a magnetic disc or a compact disk, etc.

The above implementations are only used to describe the present application, without limiting the present application; various alterations and variants can be made by those skilled in the related art without departing from the spirit and scope of the present application, so all equivalent technical solutions also belong to the scope of the present application, and the scope of patent protection of the present application should be defined by claims.

The invention claimed is:

1. An image collection system, comprising:
a gaze point detection device configured to detect, with respect to a user, a location of a gaze point of the user; and
at least one image collection device configured to focus and collect at least one first image according to the location of the gaze point;
wherein the gaze point detection device comprises:
a fundus image collection module configured to collect at least one second image of a fundus of the user, wherein the at least one second image of the fundus of the user comprises an image of the fundus or a light spot pattern projected to the fundus;
at least one adjustable lens module configured to adjust at least one imaging parameter of an optical path between the fundus image collection module and an eye of the user until the fundus image collection module obtains at least a subset of the at least one second image that satisfies at least one defined clarity criterion; and an image processing module configured to process at least the subset of the at least one second image that satisfies the at least one defined clarity criterion, obtain the at least one imaging parameter corresponding to at least the subset of the at least one second image that satisfies the at least one defined clarity criterion and an optical axis direction of the eye, and determine the location of the gaze point of the user.

2. The image collection system of claim 1, wherein a focal length of the at least one adjustable lens module is adjustable.

3. The image collection system of claim 1, wherein the gaze point detection device further comprises:
a curved beam splitting module configured to transfer at least one third image presented at the fundus to the fundus image collection module, and wherein the at least one third image respectively correspond to at least one location of the pupil associated with different optical axis directions of the eye.

4. The image collection system of claim 1, wherein the gaze point detection device further comprises:
a projection module configured to project at least one light spot pattern to the fundus.

5. The image collection system of claim 1, further comprising a wearable near-to-eye apparatus, wherein the gaze point detection device is arranged on the wearable near-to-eye apparatus.

6. The image collection system of claim 5, wherein the at least one image collection device is arranged on the wearable near-to-eye apparatus.

7. The image collection system of claim 5, wherein the wearable near-to-eye apparatus is a pair of spectacles.

8. The image collection system of claim 1, wherein the at least one image collection device is a plurality of image collection devices.

9. The image collection system of claim 8, wherein the plurality of image collection devices are disposed separately.

10. The image collection system of claim 8, wherein each image collection device in the at least one image collection device comprises:
a focusing module configured to adjust the focusing point location of at least one image collection device to which the focusing module belongs, according to location information about the at least one image collection device to which the focusing module belongs, posture information about the at least one image collection device to which the focusing module belongs, location information about the user, user posture information about the user and the location of the gaze point.

11. The image collection system of claim 10, further comprising: at least one user location information acquisition device for acquiring the location information about the user.

12. The image collection system of claim 10, further comprising:
at least one user posture information acquisition device configured to acquire the user posture information about the user.

13. The image collection system of claim 10, further comprising:
at least one collection-device location information acquisition device configured to acquire the location information about the at least one image collection device.

14. The image collection system of claim 10, further comprising:

at least one collection-device posture information acquisition device configured to acquire the posture information about the at least one image collection device.

15. The image collection system of claim 8, further comprising:
an association device configured to select at least one image collection device from the plurality of image collection devices to associate the at least one image collection device with the gaze point detection device; and
the at least one image collection device in the plurality of image collection devices configured to focus and collect the at least one first image according to the location of the gaze point.

16. A method, comprising:
detecting, with respect to a user, a location of a gaze point of the user; and
focusing and collecting at least one first image according to the location of the gaze point,
wherein the detecting comprises:
collecting at least one second image of a fundus of the user, wherein the at least one second image of the fundus of the user comprises an image of the fundus or a light spot pattern projected to the fundus;
adjusting at least one imaging parameter of an optical path between a collection location of the at least one second image and an eye of the user, until at least a subset of the at least one second image that satisfies at least one defined clarity criterion is obtained during the collecting the at least one second image of the fundus of the user;
processing at least the subset of the at least one second image that satisfies the at least one defined clarity criterion;
obtaining the at least one imaging parameter corresponding to at least the subset of the at least one second image that satisfies the at least one defined clarity criterion and an optical axis direction of the eye; and
determining the location of the gaze point of the user.

17. The method of claim 16, wherein the adjusting the at least one imaging parameter of comprises:
adjusting a focal length of at least one adjustable lens module located on the optical path between the collection location of the at least one second image and the eye of the user.

18. The method of claim 16, wherein the detecting the location of the gaze point comprises:
transferring at least one third image presented at the fundus to the collection location of the at least one second image, and wherein the at least one third image respectively correspond to at least one location of the pupil associated with different optical axis directions of the eye.

19. The method of claim 17, wherein the detecting the location of the gaze point comprises:
projecting at least one light spot pattern to the fundus.

20. The method claim 16, wherein the focusing and the collecting of the at least one first image according to the location of the gaze point comprises:
focusing and collecting the at least one first image using a plurality of image collection devices.

21. The method of claim 20, wherein the plurality of image collection devices are disposed separately.

22. The method of claim 20, wherein the focusing and collecting of the at least one first image according to the location of the gaze point with further comprises:
for each image collection device in the plurality of image collection devices, adjusting the focusing point location of the each image collection device according to location information about the each image collection device, posture information about the each image collection device, location information about the user, user posture information about the user and the location of the gaze point.

23. The method of claim 22, further comprising: acquiring the location information about the user.

24. The method of claim 22, further comprising: acquiring the user posture information about the user.

25. The method of claim 22, further comprising: acquiring the location information about the plurality of image collection devices.

26. The method of claim 22, further comprising: acquiring the posture information about the plurality of image collection devices.

27. The method of claim 20, further comprising:
determining at least one image collection device in the plurality of image collection devices according to the location of the gaze point of the user, wherein the focusing and the collecting of the at least one first image comprises focusing and collecting the at least one first image by the at least one image collection device according to the location of the gaze point.

28. A non-transitory computer-readable tangible media having at least one executable instruction stored thereon that when executed by a processor, causes the processor to perform operations, comprising:
detecting, with respect to a user, a location of a gaze point of the user; and
focusing and collecting at least one first image according to the location of the gaze point;
wherein the detecting the location of the gaze point comprises:
collecting at least one second image of a fundus of the user, wherein the at least one second image of the fundus of the user comprises an image of the fundus or a light spot pattern projected to the fundus;
adjusting at least one imaging parameter of an optical path between a collection location of the at least one second image and an eye of the user, until the at least one second image that satisfies at least one defined clarity criterion is obtained during the collecting of the at least one second image of the fundus of the user;
processing the at least one second image that satisfies the at least one defined clarity criterion;
obtaining the at least one imaging parameter corresponding to the at least one second image that satisfies the at least one defined clarity criterion and an optical axis direction of the eye; and
calculating the location of the gaze point of the user.

29. An image collection system, characterized by comprising a processing device and a memory, wherein the memory stores at least one executable instruction, the processing device is connected to the memory via a communication bus, and when the image collection system executes, the processing device executes the at least one executable instruction stored in the memory, so that the image collection system executes operations, comprising:
detecting, with respect to a user, a location of a gaze point of the user; and
focusing and collecting at least one first image according to the location of the gaze point;
wherein the detecting the location of the gaze point comprises:

collecting at least one second image of a fundus of the user, wherein the at least one second image of the fundus of the user comprises an image of the fundus or a light spot pattern projected to the fundus;

adjusting at least one imaging parameter of an optical path between a collection location of the at least one second image and an eye of the user, until the at least one second image that satisfies at least one defined clarity criterion is obtained during the collecting of the at least one second image of the fundus of the user; and processing the at least one second image that satisfies the at least one defined clarity criterion;

obtaining the at least one imaging parameter corresponding to the at least one second image that satisfies the at least one defined clarity criterion and an optical axis direction of the eye; and calculating the location of the gaze point of the user.

* * * * *